(12) United States Patent
Chen et al.

(10) Patent No.: US 10,778,397 B2
(45) Date of Patent: Sep. 15, 2020

(54) CONTROL SIGNALING TRANSMISSION METHOD, CONTROL SIGNALING RECEPTION METHOD, NETWORK DEVICE AND RECEPTION DEVICE

(71) Applicant: CHINA ACADEMY OF TELECOMMUNICATIONS TECHNOLOGY, Beijing (CN)

(72) Inventors: Runhua Chen, Beijing (CN); Qiuping Huang, Beijing (CN); Qiubin Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/751,456

(22) PCT Filed: Jul. 29, 2016

(86) PCT No.: PCT/CN2016/092348
§ 371 (c)(1),
(2) Date: Feb. 8, 2018

(87) PCT Pub. No.: WO2017/032202
PCT Pub. Date: Mar. 2, 2017

(65) Prior Publication Data
US 2018/0241527 A1    Aug. 23, 2018

(30) Foreign Application Priority Data
Aug. 25, 2015   (CN) .......................... 2015 1 0526731

(51) Int. Cl.
*H04L 5/00* (2006.01)
*H04J 11/00* (2006.01)
(Continued)

(52) U.S. Cl.
CPC ........ *H04L 5/0053* (2013.01); *H04J 11/0053* (2013.01); *H04L 5/00* (2013.01); *H04W 72/048* (2013.01); *H04W 72/1289* (2013.01)

(58) Field of Classification Search
CPC ..... H04L 5/0053; H04L 5/00; H04L 27/2613; H04L 1/0003; H04L 1/0009;
(Continued)

(56) References Cited

U.S. PATENT DOCUMENTS

| | | | |
|---|---|---|---|
| 2012/0051470 A1* | 3/2012 | Schlegel | H04L 25/03171 375/341 |
| 2013/0077578 A1* | 3/2013 | Wang | H04W 72/1278 370/329 |

(Continued)

FOREIGN PATENT DOCUMENTS

| | | |
|---|---|---|
| CN | 101945465 A | 1/2011 |
| CN | 102348216 A | 2/2012 |

(Continued)

OTHER PUBLICATIONS

International Preliminary Report on Patentability (IPRP; Ch. 1) for PCT/CN2016/092348 dated Mar. 8, 2018 and its English translation provided by WIPO.

(Continued)

*Primary Examiner* — Kibrom T Hailu
(74) *Attorney, Agent, or Firm* — Ladas & Parry, LLP (57) ABSTRACT

The present disclosure relates to the field of communication technology, and provides a control signaling transmission method, a control signaling reception method, a network device and a reception device. The control signaling transmission method includes steps of: acquiring a control instruction for processing a first signal, the first signal carrying a signal for which a reception device is not a target reception device; and transmitting the control instruction to (Continued)

```
┌─────────────────────────────────────────────┐
│ acquiring a control instruction for processing a first │ 21
│ signal, the first signal carrying a signal for which a │
│ reception device is not a target reception device      │
└─────────────────────────────────────────────┘
                      │
                      ▼
┌─────────────────────────────────────────────┐
│ acquiring first transmission parameter information │ 22
│              about the first signal                │
└─────────────────────────────────────────────┘
                      │
                      ▼
┌─────────────────────────────────────────────┐
│     transmitting the first transmission parameter     │ 23
│ information and the control instruction to the reception │
│                      device                           │
└─────────────────────────────────────────────┘
``` the reception device, the control instruction configured to control the reception device to or not to process the first signal.

16 Claims, 4 Drawing Sheets

(51) Int. Cl.
*H04W 72/04* (2009.01)
*H04W 72/12* (2009.01)

(58) Field of Classification Search
CPC ............. H04J 11/0053; H04W 72/048; H04W 72/1289; H04W 72/042; H04W 72/082
See application file for complete search history.

(56) References Cited

U.S. PATENT DOCUMENTS

| | | | |
|---|---|---|---|
| 2013/0315191 A1* | 11/2013 | Yoshimoto | H04J 11/0056 370/329 |
| 2014/0153499 A1* | 6/2014 | Wang | H04W 24/02 370/329 |
| 2014/0254516 A1* | 9/2014 | Lee | H04W 74/002 370/329 |
| 2014/0307673 A1 | 10/2014 | Zhou et al. | |
| 2014/0362769 A1 | 12/2014 | Chen et al. | |
| 2015/0229373 A1 | 8/2015 | Lee et al. | |
| 2016/0182193 A1* | 6/2016 | Tomeba | H04W 16/28 370/201 |
| 2016/0234853 A1 | 8/2016 | Yang et al. | |
| 2016/0337067 A1 | 11/2016 | Yokomakura et al. | |
| 2016/0344575 A1 | 11/2016 | Gong et al. | |
| 2017/0078126 A1* | 3/2017 | Einhaus | H04J 11/0056 |
| 2017/0317864 A1* | 11/2017 | Yuan | H04L 27/2604 |
| 2018/0159643 A1* | 6/2018 | Huang | H04B 17/345 |

FOREIGN PATENT DOCUMENTS

| | | |
|---|---|---|
| CN | 104469815 A | 3/2015 |
| CN | 104753838 A | 7/2015 |
| CN | 104811944 A | 7/2015 |
| JP | 2015509309 A | 3/2015 |
| WO | 2014121432 A1 | 8/2014 |
| WO | 2015044408 A1 | 4/2015 |
| WO | 2015107978 A1 | 7/2015 |

OTHER PUBLICATIONS

Written Opinion of the International Search Authority PCT/CN2016/092348 dated Oct. 24, 2016 and its English translation provided by WIPO.
From EPO Application No. 16838462.6, Extended European Search Report and Search Opinion dated Jun. 15, 2018.
International Search Report for PCT/CN2016/092348 dated Oct. 24, 2016 and its English translation provided by WIPO.
Written Opinion of the International Search Authority PCT/CN2016/092348 dated Oct. 24, 2016 and its English translation provided by Google Translate.
First Office Action from CN. App. No. 201510626731.4, dated Mar. 4, 2019, with English translation from Global Dossier.
Notification of Reasons for Refusal from JP App. No. 2018510369, dated Jan. 29, 2019, with English translation from JPO.

* cited by examiner

CONTROL SIGNALING TRANSMISSION METHOD, CONTROL SIGNALING RECEPTION METHOD, NETWORK DEVICE AND RECEPTION DEVICE

CROSS-REFERENCE TO RELATED APPLICATIONS

The present application is the U.S. national phase of PCT Application PCT/CN2016/092348 filed on Jul. 29, 2016 which claims the priority to Chinese patent application No. 201510526731.4 filed on Aug. 25, 2015, the disclosures of which are incorporated herein by reference in their entireties.

TECHNICAL FIELD

The present disclosure relates to the field of communication technology, in particular to a control signaling transmission method, a control signaling reception method, a network device and a reception device.

BACKGROUND

In a wireless communication system, both uplink and downlink communication for each User Equipment (UE) is supported by a base station. In a downlink direction, data is transmitted from the base station to which the UE has accessed to the UE through a downlink physical channel, and then demodulated by the UE.

There exists a plurality of base stations in a wireless communication network, and the downlink data transmission may be performed by different base stations using an identical frequency resource at an identical time point. In the case that the data is transmitted from the base station to the UEs within a cell where the base station is located, a resultant downlink transmission signal may occupy a time-domain resource and a frequency-domain resource identical to a downlink signal from the other base stations. Hence, the downlink data transmission from one base station to one UE may probably interfere with the downlink data transmission from another base station to another UE. In other words, in the case that the base station transmits different signals to a first UE and a second UE as target reception devices and the signal transmitted to the second UE does not include the signal transmitted to the first UE, the signal transmitted to the second UE may interfere with the first UE.

An intensity of an interference signal depends on various factors, including a size of the cell and transmission power. In the case that the intensity of the interference signal is great enough with respect to an intensity of a target data signal, an intensive interference may occur, and thereby demodulation performance of the target data may be adversely affected.

Interference is a principal performance restraint factor for a wireless cellular communication system, and it includes intra-cell interference and inter-cell interference. The inter-cell interference is generated in the case that a base station in an adjacent cell also schedules the data for the other UEs in the adjacent cell at an identical frequency. The UEs at an edge of the cell may be greatly adversely affected by the intra-cell interference.

The intra-cell interference is generated mainly in the case that a base station (evolved NodeB (eNB)) may transmit data to different UEs on an identical time-domain/frequency-domain resource. Identical or different beamforming matrices are adopted by the different UEs, and a multiple access operation may be achieved by differentiating the UEs in a space domain or the others. In the case that spatial channels are differentiated from each other in a better manner, different beamforming matrices may be adopted by two UEs. In the case that a beamforming matrix for one UE is orthogonal to a signal transmitted to the other UE in a better manner, it is able to reduce, to some extent, the intra-cell interference. In a Long Term Evolution (LTE) system, a conventional downlink Multiuser Multiple Input Multiple Output (MU-MIMO) technology is just based on this mode.

In addition, the MU-MIMO technology may be implemented through power or spreading code, i.e., different UEs may be configured with different power or spreading codes/sequences. The interference between the UEs may be cancelled out through an advanced receiver.

In a conventional communication technology, one target reception device may merely demodulate the data transmitted thereto, and it may not demodulate, or perform elimination/suppression treatment on, the data transmitted from a network to the other reception devices, i.e., the interference signal received by the target reception device. Here, the reception device is any UE which is capable of receiving the signal from a network device (e.g., the base station).

Along with the development of the technology, the advanced receiver has been gradually used in the communication system. As compared with a conventional receiver, the advanced receiver may be used to jointly process the signal transmitted to the target reception device and the signal transmitted to an interference UE (i.e., the interference signal received by the target reception device), and perform such treatment as elimination, suppression and cancellation on the interference signal, to improve the reception performance of the target reception device.

In a wireless communication system, the intra-cell interference may be eliminated through the advanced receiver. In order to eliminate the intra-cell interference (i.e., the interference between different UEs), it is necessary to acquire parameters of the interference signal. These parameters may be acquired through blind detection on the reception device, but the acquisition procedure is very complex.

In the conventional LTE system, dynamic downlink control signaling transmitted from the network to the UE is called as Downlink Control Information (DCI). The DCI includes transmission parameter information configured by the network for scheduling the UE to perform the data reception, e.g., a frequency band on which the data transmission is performed, a demodulator order of the data (Quadrature Phase Shift Keying (QPSK)/16-Quadrature Amplitude Modulation (QAM)/64-QAM), a transport block size (TBS), and so on. The DCI is transmitted through an air interface over a Physical Downlink Control Channel (PDCCH), and then the UE may detect the PDCCH in a blind mode to acquire its own DCI.

The DCI transmitted from the network device to one target reception device may merely include the transmission parameter information for the data reception with respect to the target reception device. In the case that a UE A is the target reception device, the DCI (i.e., DCI A) transmitted to the UE A may merely include the transmission parameter information (i.e., ControlInfo-Self, which includes X bits) for the data reception with respect to the UE A. The UE may also be configured by the network to receive transmission parameter information from a UE B (i.e., DCI B including ControlInfo-Interf). However, the interference elimination may be performed dynamically using ControlInfo-Interf within one subframe. In other words, the network side device may always transmit the transmission parameter information of the interference signal (i.e., ControlInfo-Interf) to the target UE A, and the UE A needs to perform the interference elimination using ControlInfo-Interf sometimes while it may not perform the interference elimination using ControlInfo-Interf sometimes. In addition, a Modulation and Coding Scheme (MCS) scheduled by the network is also directly related to an expected Signal-to-Noise Ratio (SNR), and the SRN for the interference elimination may be greatly different from that not for the interference elimination. In the case that the network has scheduled a large MAS for the UE but the UE does not perform any interference elimination, the data may probably not be received by the UE accurately, so the system performance may be seriously adversely affected. In the case that the network has scheduled a low MCS for the UE, it is impossible for the UE to acquire a desired data rate, and thereby the system performance may also be adversely affected.

In the related art, the reception device acquires, through blind detection, the transmission parameter information for receiving the data, but it is impossible for the reception device to eliminate the interference signal received thereby. Even in the case that the reception device is configured to receive the transmission parameter information about a signal from the interference UE, the reception device may perform the interference elimination dynamically using the transmission parameter information about the signal from the interference UE. Hence, it is impossible for the reception device to match the MCS scheduled by the network, and thereby the data rate of the reception device as well as the system performance may be adversely affected.

SUMMARY

An object of the present disclosure is to provide a control signaling transmission method, a control signaling reception method, a network device and a reception device, so as to control the UE to or not to perform the interference elimination using the transmission parameter information about the interference signal notified by the network device, thereby to ensure the data rate of the reception device.

In one aspect, the present disclosure provides in some embodiments a control signaling transmission method, including steps of: acquiring a control instruction for processing a first signal, the first signal carrying a signal for which a reception device is not a target reception device; and transmitting the control instruction to the reception device, the control instruction configured to control the reception device to or not to process the first signal.

In a possible embodiment of the present disclosure, the control instruction includes control information about at least one data stream of the first signal.

In a possible embodiment of the present disclosure, the control information includes a first state in which the first signal is processed by the reception device or a second state in which the first signal is not processed by the reception device, and the first state is different from the second state.

In a possible embodiment of the present disclosure, the control information is of 1 bit.

In a possible embodiment of the present disclosure, the control information is a sequence of n bits, each bit in the sequence is used to represent the control information about at least one data stream of the first signal, and n>1.

In a possible embodiment of the present disclosure, the control signaling transmission method further includes acquiring first transmission parameter information about the first signal.

In a possible embodiment of the present disclosure, the control signaling transmission method further includes transmitting the first transmission parameter information and the control instruction to the reception device.

In a possible embodiment of the present disclosure, the step of transmitting the first transmission parameter information and the control instruction to the reception device includes transmitting each of the first transmission parameter information and the control instruction to the reception device separately, or performing a joint encoding operation on the first transmission parameter information and the control instruction to acquire first encoding information and transmit the first encoding information to the reception device.

In a possible embodiment of the present disclosure, the control signaling transmission method further includes acquiring second transmission parameter information about a second signal, and the second signal carries a signal for which the reception device is the target reception device.

In a possible embodiment of the present disclosure, the control signaling transmission method further includes transmitting the first transmission parameter information and the second transmission parameter information to the reception device.

In a possible embodiment of the present disclosure, the control signaling transmission method further includes transmitting each of the first transmission parameter information and the second transmission parameter information to the reception device separately, or performing a joint encoding operation on the first transmission parameter information and the second transmission parameter information to acquire second encoding information and transmit the second encoding information to the reception device.

In another aspect, the present disclosure provides in some embodiments a control signaling reception method, including steps of: receiving from a network device a control instruction for processing a first signal, the first signal carrying a signal for which a reception device is not a target reception device; and determining whether or not the first signal is to be processed in accordance with the control instruction.

In a possible embodiment of the present disclosure, the control instruction includes control information about at least one data stream of the first signal.

In a possible embodiment of the present disclosure, the control information includes a first state in which the first signal is processed by the reception device or a second state in which the first signal is not processed by the reception device, and the first state is different from the second state.

In a possible embodiment of the present disclosure, the control signaling reception method further includes: receiving first transmission parameter information about the first signal from the network device directly; or receiving third encoding information acquired by the network device after performing a joint encoding operation on the first transmission parameter information and the control instruction, and decoding the third encoding information to acquire the first transmission parameter information and the control instruction.

In a possible embodiment of the present disclosure, the control signaling reception method further includes receiving the first transmission parameter information about the first signal and second transmission parameter information about a second signal from the network device, and the second signal carries a signal for which the reception device is the target reception device.

In a possible embodiment of the present disclosure, the control signaling reception method further includes: receiving the first transmission parameter information about the first signal and the second transmission parameter information about the second signal from the network device directly; or receiving fourth encoding information acquired by the network device after a joint encoding operation on the first transmission parameter information and the second transmission parameter information, and decoding the fourth encoding information to acquire the first transmission parameter information and the second transmission parameter information.

In yet another aspect, the present disclosure provides in some embodiments a network device, including: an acquisition module configured to acquire a control instruction for processing a first signal, the first signal carrying a signal for which a reception device is not a target reception device; and a transmission module configured to transmit the control instruction to the reception device, the control instruction configured to control the reception device to or not to process the first signal.

In still yet another aspect, the present disclosure provides in some embodiments a network device, including a processor, and a memory connected to the processor and configured to store therein programs and data for the operation of the processor. The processor is configured to call and execute the programs and data stored in the memory, to: acquire a control instruction for processing a first signal, the first signal carrying a signal for which a reception device is not a target reception device; and transmit the control instruction to the reception device, the control instruction configured to control the reception device to or not to process the first signal.

In still yet another aspect, the present disclosure provides in some embodiments a reception device, including: a reception module configured to receive from a network device a control instruction for processing a first signal, the first signal carrying a signal for which a reception device is not a target reception device; and a processing module configured to determine whether or not the first signal is to be processed in accordance with the control instruction.

In still yet another aspect, the present disclosure provides in some embodiments a reception device, including a processor, and a memory connected to the processor and configured to store therein programs and data for the operation of the processor. The processor is configured to call and execute the programs and data stored in the memory, to: receive from a network device a control instruction for processing a first signal, the first signal carrying a signal for which a reception device is not a target reception device; and determine whether or not the first signal is to be processed in accordance with the control instruction.

According to the embodiments of the present disclosure, the network device transmits the control instruction indicating whether or not to process the first signal received by the target reception device to the reception device, so that the reception device may or may not process the received signal in accordance with the control instruction. The first signal carries the signal for which the reception device is not the target reception device. Generally, in the case that the signal for which the reception device is not the target reception device has been received by the reception device, this signal is just an interference signal. The reception device may determine whether or not the interference signal is to be eliminated in accordance with the control instruction. As a result, it is able for the network device to control the reception device to or not to process the interference signal (e.g., to eliminate the interference signal) in accordance with the control instruction received from the network device, thereby to ensure a data rate of the reception device.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

In a conventional system, in the case of processing an interference signal, a reception device is not controlled by a network side device, and thereby a data rate of the reception device may be adversely affected. An object of the present disclosure is to provide a control signaling transmission method, a control signaling reception method, a network device and a reception device, to control the reception device to or not to eliminate the interference signal using a control instruction from the network device, thereby to ensure the data rate of the reception device.

It should be appreciated that, the so-called "elimination" involved in the present disclosure collectively refers to a signal processing method, which may include, but not limited to, various possible operations such as elimination, suppression, cancellation and processing.

Figure 1:
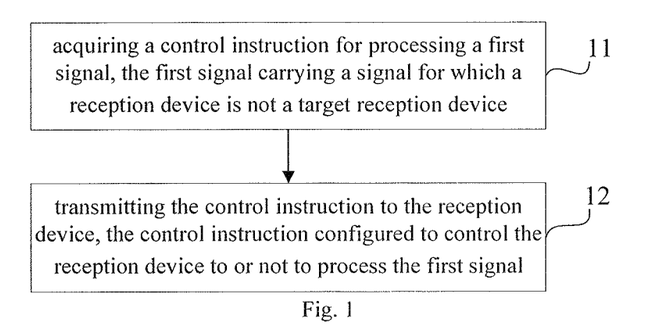
FIG. 1 is a flow chart of a control signaling transmission method according to one embodiment of the present disclosure.

As shown in FIG. 1, the present disclosure provides in some embodiments a control signaling transmission method, which includes the following steps.

Step 11: acquiring a control instruction for processing a first signal, the first signal carrying a signal for which a reception device is not a target reception device. For example, in the case that a base station transmits different signals to a first reception device and a second reception device as target reception devices and the signal transmitted to the second reception device does not include any data which should be transmitted to the first reception device as the target reception device, the signal which should be transmitted to the second reception device as the target reception device may interfere with the first reception device. The first signal may be an interference signal received by the reception device.

Step 12: transmitting the control instruction to the reception device, the control instruction configured to control the reception device to or not to process the first signal.

According to the embodiments of the present disclosure, the network device transmits the control instruction indicating whether or not to process the first signal received by the target reception device to the reception device, so that the reception device may or may not process the received signal in accordance with the control instruction. The first signal carries the signal for which the reception device is not the target reception device. Generally, in the case that the signal for which the reception device is not the target reception device has been received by the reception device, this signal is just an interference signal. The reception device may determine whether or not the interference signal is to be eliminated in accordance with the control instruction. As a result, it is able for the network device to control the reception device to or not to eliminate the interference signal in accordance with the control instruction received from the network device, thereby to ensure a data rate of the reception device.

In a possible embodiment of the present disclosure, the control instruction includes control information about at least one data stream of the first signal. Further, the control information includes a first state in which the first signal is processed by the reception device or a second state in which the first signal is not processed by the reception device, and the first state is different from the second state.

For example, in the case that the control information includes 1 bit and this bit is 0, the control information may represent the first state, and in the case that this bit is 1, the control information may represent the second state. In the first state, the reception device may or may not eliminate the interference signal carried in the first signal in accordance with the control instruction. In the second state, the reception device may not or may eliminate the interference signal carried in the first signal in accordance with the control instruction.

In a possible embodiment of the present disclosure, the control information may also be a sequence of n bits, each bit in the sequence may be used to represent the control information about at least one data stream of the first signal, and n>1.

For example, the reception device may be notified through an individual bit field of the control signaling, to enable or disenable an interference elimination function. The downlink control signaling transmitted from the network device (base station) to the reception device includes a 1-bit control instruction for enabling or disenabling the interference elimination function. In the case that the bit is 0 in the first state, it means that the reception device does not need to perform the interference elimination, and in the case that the bit is 1 in the second state, it means that the reception device needs to perform the interference elimination.

A multi-antenna Multiple Input Multiple Output (MIMO) function is supported by a conventional communication system, and each base station is provided with a plurality of antennae and may transmit a plurality of data streams simultaneously. Identically, the interference signal may include one data stream or a plurality of data streams. Through the signal included in the downlink control instruction for enabling or disenabling the interference elimination, it is able to control the data stream or the plurality of data streams.

The bit may be a control bit corresponding to one data stream transmitted to the reception device. In the case that there exist n data streams, the control instruction may be transmitted separately with respect to each of the n data streams.

For example, in a possible embodiment of the present disclosure, an eNB (the base station) may transmit 1 bit to a UE, to notify the UE to perform the interference elimination on all the interference data streams. In the case that the bit is 1, the UE may perform the interference elimination on all the interference data streams, and in the case that the bit is 0, the UE may not perform the interference elimination on all the interference data streams. At this time, one bit is used to control the interference elimination on all the interference data streams. In another possible embodiment of the present disclosure, the eNB may transmit a sequence of n bits corresponding to M data streams to the reception device, and each bit is used to notify the target reception device to or not to perform the interference elimination on the corresponding data stream. In some embodiments of the present disclosure, the eNB may transmit a sequence of n bits to the UE, to control the interference elimination on the M interference data streams, where n<M. A correspondence between the bits and the data streams may be agreed by the network device and the UE in advance, or notified by the network device to the UE through high-layer signaling. In some embodiments of the present disclosure, n=2, and M=4, where a first bit is used to control the interference elimination on a first data stream and a second data stream, and a second bit is used to control the interference elimination on a third data stream and a fourth data stream.

The control information may further be represented by an idle state of the downlink control signaling. The signaling for enabling or disenabling the interference elimination function may be encoded together with the other control signaling. For example, one of a state of MCS signaling and a state of a TBS index or any other parameter may be used to indicate the UE to or not to perform the interference elimination. In an LTE system, the MCS signaling includes 5 bits corresponding to 32 MCS levels. However, less than 32 MCS levels may be utilized actually, and some of the MCS levels may be reserved. The reserved MCS states/levels may be used to notify the UE to enable or disenable the interference elimination function. It should be appreciated that, the MCS here refers to an MCS parameter of the interference signal (which is notified by the base station to the UE through downlink signaling), rather than an MCS parameter of a data signal transmitted to the UE itself.

In some embodiments of the present disclosure, for a Serial Interference Cancellation (SIC) receiver, the network device may notify to the reception device a possible modulation sequence of the interference signal that may be received by the reception device through the downlink signaling, e.g., QPSK, 16-QAM or 65-QAM. In the case that the system is incapable of supporting the interference elimination on a 256-QAM signal, the QAM of the interference signal may be notified to the reception device through two bits in the downlink signaling (controlinfo-interf), and the two bits may correspond to four states. The modulation sequence of the interference signal merely includes three states (QPSK, 16-QAM and 64-QAM), so the remaining QAM level may be used to notify the UE to disenable the interference elimination function, as shown in the following table.

| QAM of interference signal and bit field for controlling interference elimination (2-bit) | QAM of interference signal or OFF-state for disenabling interference elimination |
|---|---|
| 0 | QPSK |
| 1 | 16QAM |
| 2 | 64QAM |
| 3 | OFF-state for disenabling interference elimination |

In the case that the 2-bit downlink signaling received by the reception device has a value of 0, 1 or 2, the reception device may determine that the modulation mode of the interference signal is QPSK, 16-QAM or 64-QAM, and then eliminate the interference signal. In the case that the 2-bit downlink signaling has a value of 3, the reception device may not eliminate the interference signal, i.e., the interference elimination function may be disenabled.

In the case that the interference signal includes n data streams, the above procedure may be applied to each data stream, i.e., with respect to each data stream, the network device may notify the UE of the QAM level of the interference signal and whether the interference elimination function is to be enabled or disenable through the 2-bit downlink control signaling.

Figure 2:
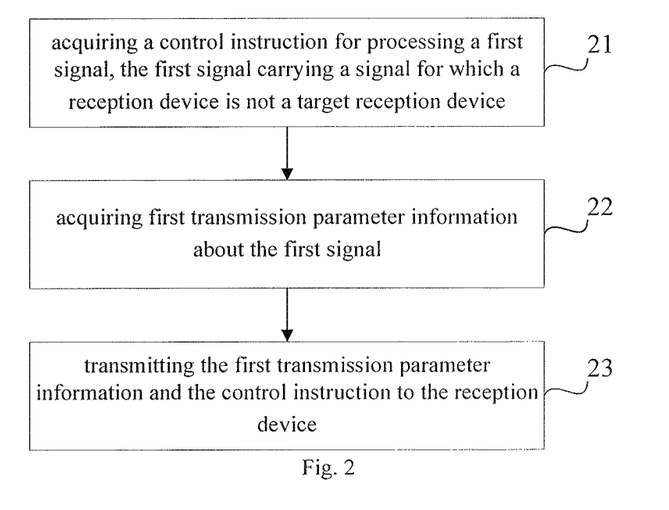
FIG. 2 is another flow chart of the control signaling transmission method according to one embodiment of the present disclosure.

As shown in FIG. 2, the present disclosure provides in some embodiments a control signaling transmission method, which includes the following steps.

Step 21: acquiring a control instruction for processing a first signal, the first signal carrying a signal for which a reception device is not a target reception device. For example, in the case that a base station transmits different signals to a first reception device and a second reception device as target reception devices and the signal transmitted to the second reception device does not include any data which should be transmitted to the first reception device as the target reception device, the signal which should be transmitted to the second reception device as the target reception device may interfere with the first reception device. The first signal may be an interference signal received by the reception device.

Step 22: acquiring first transmission parameter information about the first signal.

Step 23: transmitting the first transmission parameter information and the control instruction to the reception device.

In Step 23, each of the first transmission parameter information and the control instruction may be transmitted to the reception device separately, or a joint encoding operation may be performed on the first transmission parameter information and the control instruction to acquire first encoding information and then the first encoding information may be transmitted to the reception device.

According to the embodiments of the present disclosure, the network device may transmit to the reception device the first transmission parameter information for the interference elimination, so that the reception device may eliminate the interference signal in accordance with the first transmission parameter information.

In some embodiments of the present disclosure, the first transmission parameter information includes first data reception parameter information about a first UE within a cell identical to the reception device, or second data reception parameter information about a second UE within a cell different from the reception device.

The reception device may be configured with different transmission modes (TMs) through Radio Resource Control (RRC) signaling, and the different transmission modes correspond to different DCI formats in a one-to-one correspondence manner. After the reception device has been configured with a certain transmission mode, the reception device may detect DCI A in a blind manner within each subframe. In the case that the DCI A has been detected successfully, the reception device may determine the corresponding DCI format from the network device, and then receive the data through a Physical Downlink Shared Channel (PDSCH) using the transmission parameter information about the data in the DCI A.

In the case that the reception device needs to eliminate the interference signal and the reception device has been configured by the network device to eliminate the interference, the reception device needs to acquire the transmission parameter information about the interference signal (controlinfo-interf), i.e., acquire the first data reception parameter information about the first UE. Hence, the network device may transmit the first data reception parameter information about the first UE within a cell identical to the reception device to the reception device. At this time, the reception device may detect DCI B carrying the first data reception parameter information about the first UE in a blind manner, and try to acquire the first data reception parameter information about the first UE.

Upon the acquisition of the first data reception parameter information about the first UE, the reception device may eliminate the interference signal from the first UE.

During the elimination, the reception device may demodulate or even decode, to some extent, the interference signal from the first UE in accordance with the first data reception parameter information about the first UE, and then eliminate a component of the interference signal from the received signal using a processing gain of the receiver.

The above-mentioned interference elimination method may also be applied to the other embodiments of the present disclosure.

In some embodiments of the present disclosure, in the case that the first transmission parameter information is the second data reception parameter information about the second UE within a cell different from the reception device and the reception device needs to eliminate the interference signal and has been configured by the network device to perform the interference elimination, the reception device needs to acquire the second data reception parameter information about the second UE. Hence, the network device may transmit the second data reception parameter information about the second UE within a cell different from the reception device to the reception device. At this time, the reception device may detect DCI C carrying the second data reception parameter information about the second UE in a blind manner, and try to acquire the second data reception parameter information about the second UE.

Upon the acquisition of the second data reception parameter information about the second UE, the reception device may eliminate the interference signal from the second UE. During the elimination, the reception device may demodulate or even decode, to some extent, the interference signal from the second UE in accordance with the second data reception parameter information about second first UE, and then eliminate a component of the interference signal from the received signal using a processing gain of the receiver.

Figure 3:
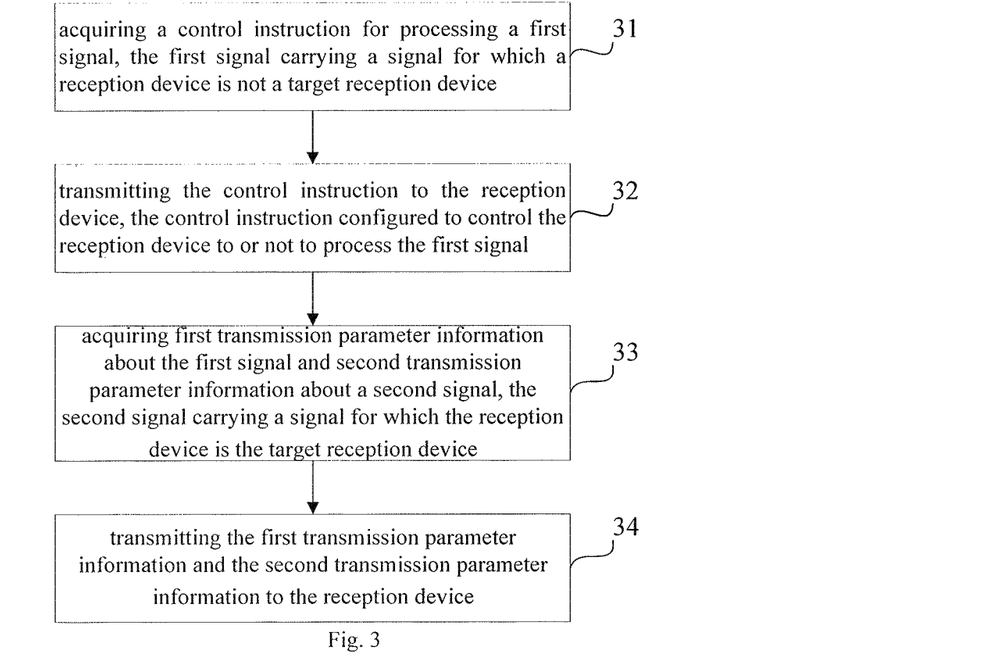
FIG. 3 is yet another flow chart of the control signaling transmission method according to one embodiment of the present disclosure.

As shown in FIG. 3, the present disclosure provides in some embodiments a control signaling transmission method, which includes the following steps.

Step 31: acquiring a control instruction for processing a first signal, the first signal carrying a signal for which a reception device is not a target reception device. For example, in the case that a base station transmits different signals to a first reception device and a second reception device as target reception devices and the signal transmitted to the second reception device does not include any data which should be transmitted to the first reception device as the target reception device, the signal which should be transmitted to the second reception device as the target reception device may interfere with the first reception device. The first signal may be an interference signal received by the reception device.

Step 32: transmitting the control instruction to the reception device, the control instruction configured to control the reception device to or not to process the first signal.

Step 33: acquiring first transmission parameter information about the first signal and second transmission parameter information about a second signal, the second signal carrying a signal for which the reception device is the target reception device.

Step 34: transmitting the first transmission parameter information and the second transmission parameter information to the reception device.

In Step 34, each of the first transmission parameter information and the second transmission parameter information may be transmitted to the reception device separately, or a joint encoding operation may be performed on the first transmission parameter information and the second transmission parameter information to acquire second encoding information and then the second encoding information may be transmitted to the reception device.

In some embodiments of the present disclosure, the base station may notify the reception device UE A of parameter information about the interference signal that may be received by the reception device UE A (i.e., parameter information about the signal from a UE B, e.g., the above-mentioned first transmission parameter information). The UE B may be located within a cell identical to, or different from, the UE A.

In the case that the control signaling including the data reception parameter information about the UE A itself is DCI A (i.e., the second transmission parameter information), the first transmission parameter information and the second transmission parameter information may be transmitted to the UE A separately or jointly.

According to the embodiments of the present disclosure, the network device transmits the control instruction indicating whether or not to process the first signal received by the target reception device to the reception device, so that the reception device may or may not process the received signal in accordance with the control instruction. The first signal carries the signal for which the reception device is not the target reception device. Generally, in the case that the signal for which the reception device is not the target reception device has been received by the reception device, this signal is just an interference signal. The reception device may determine whether or not the interference signal is to be eliminated in accordance with the control instruction. As a result, it is able for the network device to control the reception device to or not to eliminate the interference signal in accordance with the control instruction received from the network device, thereby to ensure a data rate of the reception device.

Figure 4:
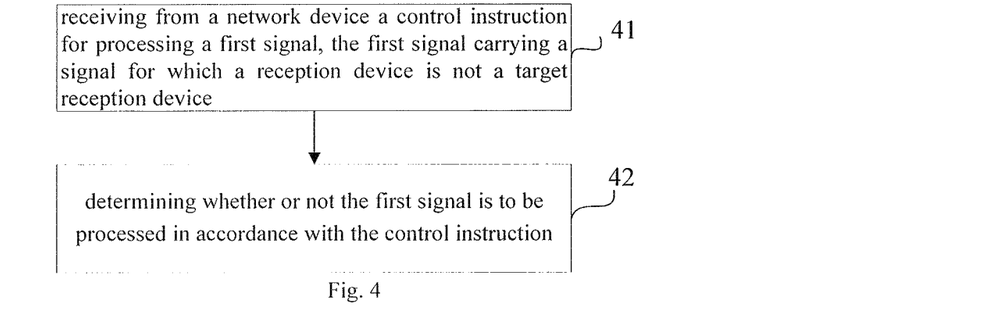
FIG. 4 is a flow chart of a control signaling reception method according to one embodiment of the present disclosure.

As shown in FIG. 4, the present disclosure further provides in some embodiments a control signaling reception method, which includes the following steps.

Step 41: receiving from a network device a control instruction for processing a first signal, the first signal carrying a signal for which a reception device is not a target reception device. For example, in the case that a base station transmits different signals to a first reception device and a second reception device as target reception devices and the signal transmitted to the second reception device does not include any data which should be transmitted to the first reception device as the target reception device, the signal which should be transmitted to the second reception device as the target reception device may interfere with the first reception device. The first signal may be an interference signal received by the reception device.

Step 42: determining whether or not the first signal is to be processed in accordance with the control instruction.

According to the embodiments of the present disclosure, the network device transmits the control instruction indicating whether or not to process the first signal received by the target reception device to the reception device, so that the reception device may or may not process the received signal in accordance with the control instruction. The first signal carries the signal for which the reception device is not the target reception device. Generally, in the case that the signal for which the reception device is not the target reception device has been received by the reception device, this signal is just an interference signal. The reception device may determine whether or not the interference signal is to be eliminated in accordance with the control instruction. As a result, it is able for the network device to control the reception device to or not to eliminate the interference signal in accordance with the control instruction received from the network device, thereby to ensure a data rate of the reception device.

In a possible embodiment of the present disclosure, the control instruction includes control information about at least one data stream of the first signal.

In a possible embodiment of the present disclosure, the control information includes a first state in which the first signal is processed by the reception device or a second state in which the first signal is not processed by the reception device, and the first state is different from the second state.

For example, in the case that the control information includes 1 bit and this bit is 0, the control information may represent the first state, and in the case that this bit is 1, the control information may represent the second state. In the first state, the reception device may or may not eliminate the interference signal carried in the first signal in accordance with the control instruction. In the second state, the reception device may not or may eliminate the interference signal carried in the first signal in accordance with the control instruction.

In a possible embodiment of the present disclosure, the control information may also be a sequence of n bits, each bit in the sequence may be used to represent the control information about at least one data stream of the first signal, and n>1.

Figure 5:
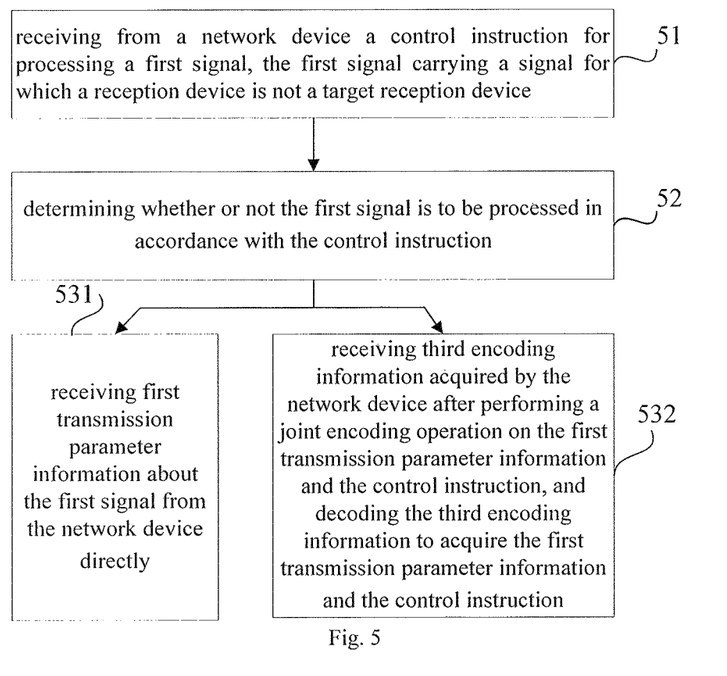
FIG. 5 is another flow chart of the control signaling reception method according to one embodiment of the present disclosure.

As shown in FIG. 5, the present disclosure further provides in some embodiments a control signaling reception method, which includes the following steps.

Step 51: receiving from a network device a control instruction for processing a first signal, the first signal carrying a signal for which a reception device is not a target reception device. For example, in the case that a base station transmits different signals to a first reception device and a second reception device as target reception devices and the signal transmitted to the second reception device does not include any data which should be transmitted to the first reception device as the target reception device, the signal which should be transmitted to the second reception device as the target reception device may interfere with the first reception device. The first signal may be an interference signal received by the reception device.

Step 52: determining whether or not the first signal is to be processed in accordance with the control instruction.

Step 531: receiving first transmission parameter information about the first signal from the network device directly; or Step 532: receiving third encoding information acquired by the network device after performing a joint encoding operation on the first transmission parameter information and the control instruction, and decoding the third encoding information to acquire the first transmission parameter information and the control instruction.

In some embodiments of the present disclosure, the first transmission parameter information about the first signal received by the reception device may be jointly encoded with data transmission parameter information of the reception device itself, i.e., second transmission parameter information. In addition, the first transmission parameter information and the second transmission parameter information may be received by the reception device separately.

According to the embodiments of the present disclosure, it is able for the reception device, under the control of the network device, to or not to eliminate the interference signal using the first transmission parameter information from the network device, thereby to ensure the data rate of the reception device.

Figure 6:
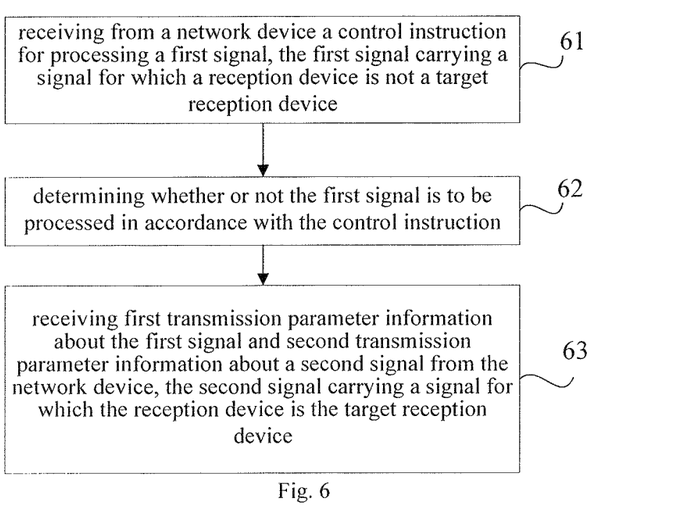
FIG. 6 is yet another flow chart of the control signaling reception method according to one embodiment of the present disclosure.

As shown in FIG. 6, the present disclosure further provides in some embodiments a control signaling reception method, which includes the following steps.

Step 61: receiving from a network device a control instruction for processing a first signal, the first signal carrying a signal for which a reception device is not a target reception device. For example, in the case that a base station transmits different signals to a first reception device and a second reception device as target reception devices and the signal transmitted to the second reception device does not include any data which should be transmitted to the first reception device as the target reception device, the signal which should be transmitted to the second reception device as the target reception device may interfere with the first reception device. The first signal may be an interference signal received by the reception device.

Step 62: determining whether or not the first signal is to be processed in accordance with the control instruction.

Step 63: receiving first transmission parameter information about the first signal and second transmission parameter information about a second signal from the network device, the second signal carrying a signal for which the reception device is the target reception device.

Step 63 may include: receiving the first transmission parameter information about the first signal and the second transmission parameter information about the second signal from the network device directly; or receiving fourth encoding information acquired by the network device after a joint encoding operation on the first transmission parameter information and the second transmission parameter information, and decoding the fourth encoding information to acquire the first transmission parameter information and the second transmission parameter information.

According to the embodiments of the present disclosure, it is able for the reception device, under the control of the network device, to or not to eliminate the interference signal using the first transmission parameter information from the network device, thereby to ensure the data rate of the reception device and improve the system performance.

The beneficial effects of the present disclosure will be described hereinafter in conjunction with a specific application scenario, as compared with the related art.

In the case that two UEs, e.g., UE A and UE B, are located within a cell, UE A and UE B are scheduled together within one subframe. UE A is a proximal one and UE B is a remote one, and UE A needs to eliminate the interference from UE B. Of course, UE B may also be located within a cell different from UE A. UE A may determine whether or not to eliminate the interference signal from UE B in accordance with the control signaling transmitted froth the network device to UE A. To be specific, UE A may receive from the network device ControlInfo-Interf (i.e., the transmission parameter information about the signal from UE B), so that UE A may eliminate the interference signal ill accordance with the transmission parameter information ControlInfo-Interf about the signal from UE B in the case that the control instruction indicates that UE A is allowed to eliminate the interference signal. At this time, the base station may schedule an MCS, which matches an SNR for the interference elimination, for UE A, to ensure the data rate of UE A and improve the system performance. However, in the related art, it is impossible for the network device to schedule the MCS, which matches the SNR for the interference elimination, for the UE A.

Figure 7:
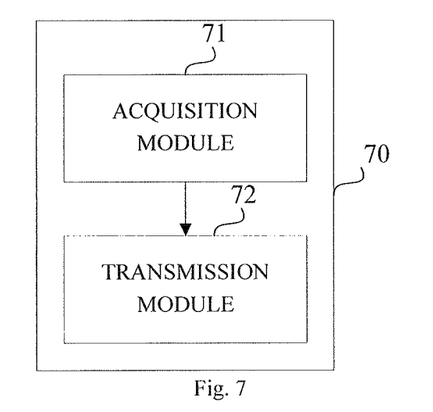
FIG. 7 is a schematic view showing a network device according to one embodiment of the present disclosure.

As shown in FIG. 7, the present disclosure further provides in some embodiments a base station 70, which includes: an acquisition module 71 configured to acquire a control instruction for processing a first signal, the first signal carrying a signal for which a reception device is not a target reception device; and a transmission module 72 configured to transmit the control instruction to the reception device, the control instruction configured to control the reception device to or not to process the first signal.

It should be appreciated that, the implementation of the base station may refer to those of the above-mentioned methods, and an identical technical effect may also be achieved.

Figure 8:
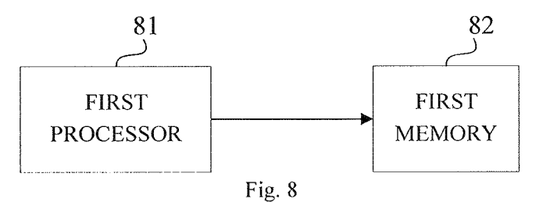
FIG. 8 is another schematic view showing the network device according to one embodiment of the present disclosure.

As shown in FIG. 8, the present disclosure further provides in some embodiments a network device, which includes a first processor 81 and a memory 82 connected to the first processor 81 and configured to store therein programs and data for the operation of the first processor 81. The first processor 81 is configured to call and execute the programs and data stored in the memory, to: acquire a control instruction for processing a first signal, the first signal carrying a signal for which a reception device is not a target reception device; and transmit the control instruction to the reception device, the control instruction configured to control the reception device to or not to process the first signal.

Figure 9:
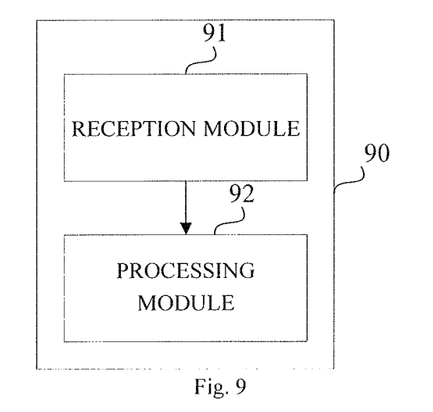
FIG. 9 is a schematic view showing a reception device according to one embodiment of the present disclosure.

As shown in FIG. 9, the present disclosure further provides in some embodiments a reception device 90, which includes: a reception module 91 configured to receive from a network device a control instruction for processing a first signal, the first signal carrying a signal for which a reception device is not a target reception device; and a processing module 92 configured to determine whether or not the first signal is to be processed in accordance with the control instruction.

It should be appreciated that, the implementation of the reception device may refer to those of the above-mentioned methods, and an identical technical effect may also be achieved.

Figure 10:
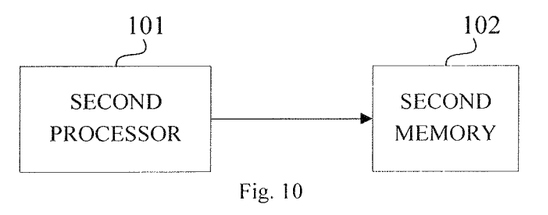
FIG. 10 is another schematic view showing the reception device according to one embodiment of the present disclosure.

As shown in FIG. 10, the present disclosure further provides in some embodiments a reception device, which includes a second processor 101 and a second memory 102 connected to the second processor 101 and configured to store therein programs and data for the operation of the second processor 101. The second processor 102 is configured to call and execute the programs and data stored in the second memory 102, to: receive from a network device a control instruction for processing a first signal, the first signal carrying a signal for which a reception device is not a target reception device; and determine whether or not the first signal is to be processed in accordance with the control instruction.

It should be appreciated that, all or parts of the above-mentioned steps in the embodiments of the present disclosure may be implemented by hardware, or by hardware in conjunction with a computer program. The computer program includes instructions for executing all or parts of the above-mentioned steps, and it may be stored in a computer-readable storage medium in any form.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A control signaling transmission method, comprising:
   acquiring a control instruction for processing a first signal, the first signal carrying one or more data streams for which a reception device is not a target reception device; and
   transmitting the control instruction to the reception device, the control instruction configured to control the reception device to or not to process the first signal, wherein
   the control instruction comprises control information about each of at least one of the one or more data streams of the first signal, and the control information is a 2-bit signaling used to notify the reception device of a Quadrature Amplitude Modulation (QAM) level of the first signal and whether or not to enable an interference elimination function.

2. The control signaling transmission method according to claim 1, wherein the control information comprises a first state in which the first signal is processed by the reception device or a second state in which the first signal is not processed by the reception device, and the first state is different from the second state.

3. The control signaling transmission method according to claim 1, further comprising acquiring first transmission parameter information about the first signal.

4. The control signaling transmission method according to claim 3, further comprising transmitting the first transmission parameter information and the control instruction to the reception device.

5. The control signaling transmission method according to claim 4, wherein transmitting the first transmission parameter information and the control instruction to the reception device comprises:
   transmitting each of the first transmission parameter information and the control instruction to the reception device separately, or
   performing a joint encoding operation on the first transmission parameter information and the control instruction to acquire first encoding information and transmitting the first encoding information to the reception device.

6. The control signaling transmission method according to claim 3, further comprising acquiring second transmission parameter information about a second signal, wherein the second signal carries a signal for which the reception device is the target reception device.

7. The control signaling transmission method according to claim 6, further comprising transmitting the first transmission parameter information and the second transmission parameter information to the reception device.

8. The control signaling transmission method according to claim 7, further comprising:
   transmitting each of the first transmission parameter information and the second transmission parameter information to the reception device separately, or
   performing a joint encoding operation on the first transmission parameter information and the second transmission parameter information to acquire second encoding information and transmit the second encoding information to the reception device.

9. The control signaling transmission method according to claim 1, wherein, the control information about a first one of the one or more data streams is separated from the control information about a second one of the one or more data streams.

10. A control signaling reception method, comprising:
receiving from a network device a control instruction for processing a first signal, the first signal carrying one or more data streams for which a reception device is not a target reception device; and
determining whether or not the first signal is to be processed in accordance with the control instruction, wherein
the control instruction comprises control information about each of at least one of the one or more data streams of the first signal, and the control information is a 2-bit signaling used to notify the reception device of a Quadrature Amplitude Modulation (QAM) level of the first signal and whether or not to enable an interference elimination function.

11. The control signaling reception method according to claim 10, wherein the control information comprises a first state in which the first signal is processed by the reception device or a second state in which the first signal is not processed by the reception device, and the first state is different from the second state.

12. The control signaling reception method according to claim 10, further comprising:
receiving first transmission parameter information about the first signal from the network device directly; or
receiving third encoding information acquired by the network device after performing a joint encoding operation on the first transmission parameter information and the control instruction, and decoding the third encoding information to acquire the first transmission parameter information and the control instruction.

13. The control signaling reception method according to claim 10, further comprising:
receiving the first transmission parameter information about the first signal and second transmission parameter information about a second signal from the network device, wherein the second signal carries a signal for which the reception device is the target reception device.

14. The control signaling reception method according to claim 13, further comprising:
receiving the first transmission parameter information about the first signal and the second transmission parameter information about the second signal from the network device directly; or
receiving fourth encoding information acquired by the network device after a joint encoding operation on the first transmission parameter information and the second transmission parameter information, and decoding the fourth encoding information to acquire the first transmission parameter information and the second transmission parameter information.

15. A network device, comprising a processor, and a memory connected to the processor and configured to store in the memory programs and data for an operation of the processor, wherein the processor is configured to call and execute the programs and data stored in the memory, to:
acquire a control instruction for processing a first signal, the first signal carrying one or more data streams for which a reception device is not a target reception device; and
transmit the control instruction to the reception device, the control instruction configured to control the reception device to or not to process the first signal, wherein
the control instruction comprises control information about each of at least one of the one or more data streams of the first signal, and the control information is a 2-bit signaling used to notify the reception device of a Quadrature Amplitude Modulation (QAM) level of the first signal and whether or not to enable an interference elimination function.

16. A reception device, comprising a processor, and a memory connected to the processor and configured to store in the memory programs and data for an operation of the processor, wherein the processor is configured to call and execute the programs and data stored in the memory, to:
receive from a network device a control instruction for processing a first signal, the first signal carrying one or more data streams for which a reception device is not a target reception device; and
determine whether or not the first signal is to be processed in accordance with the control instruction, wherein
the control instruction comprises control information about each of at least one of the one or more data streams of the first signal, and the control information is a 2-bit signaling used to notify the reception device of a Quadrature Amplitude Modulation (QAM) level of the first signal and whether or not to enable an interference elimination function.

* * * * *